(12) United States Patent
Oladeji

(10) Patent No.: US 8,465,556 B2
(45) Date of Patent: Jun. 18, 2013

(54) METHOD OF FORMING A SOLID STATE CATHODE FOR HIGH ENERGY DENSITY SECONDARY BATTERIES

(75) Inventor: Isaiah O. Oladeji, Gotha, FL (US)

(73) Assignee: Sisom Thin Films LLC, Orlando, FL (US)

( * ) Notice: Subject to any disclaimer, the term of this patent is extended or adjusted under 35 U.S.C. 154(b) by 281 days.

(21) Appl. No.: 12/928,001

(22) Filed: Dec. 1, 2010

(65) Prior Publication Data

US 2012/0137508 A1  Jun. 7, 2012

(51) Int. Cl.
*H01M 6/00* (2006.01)
*B05D 1/02* (2006.01)

(52) U.S. Cl.
USPC ................ 29/623.1; 29/623.5; 427/427

(58) Field of Classification Search
USPC .............. 29/623.5, 623.1, 623.3; 429/231.95; 427/422, 426, 427, 404, 419.1, 78; 423/594.15
See application file for complete search history.

(56) References Cited

U.S. PATENT DOCUMENTS

| | | | |
|---|---|---|---|
| 4,549,597 A * | 10/1985 | Hamamura | 164/35 |
| 5,589,300 A | 12/1996 | Fauteaux et al. | |
| 5,718,989 A | 2/1998 | Aoki et al. | |
| 5,783,333 A | 7/1998 | Mayer | |
| 5,795,558 A | 8/1998 | Aoki et al. | |
| 6,350,543 B2 | 2/2002 | Yang et al. | |
| 6,379,842 B1 | 4/2002 | Mayer | |
| 6,582,481 B1 | 6/2003 | Erbil | |
| 7,008,608 B2 | 3/2006 | Park et al. | |
| 7,258,821 B2 | 8/2007 | Yang et al. | |

FOREIGN PATENT DOCUMENTS

WO   WO 2010/113659   * 10/2010

OTHER PUBLICATIONS

Neudecker et al. Lithium Free Thin Film Battery with In Situ Plated Li Anode, J. Electrochem. Soc. 147:517-23 (2000).
Chen et al. Electrostatic Spray Deposition of Thin Layers of Cathode Materials for Lithium Battery, Solid State Ionics 86-88:1301-06 (1996).
Patil et al. Issue and Challenges Facing Rechargeable Thin Film Lithium Batteries, Materials Research Bull. 43:1913-42 (2008).
Kim et al. The character. of LiMn2O4 thin film cathode for lithium rechargeable microbattery prep. by liq. source misted chem. dep. Chemical Vap. Deposition 9:187-92 (2003).

* cited by examiner

*Primary Examiner* — Raymond Alejandro
(74) *Attorney, Agent, or Firm* — Robert J. Lauf

(57) ABSTRACT

A method for making a solid state cathode comprises the following steps: forming an alkali free first solution comprising at least one transition metal and at least two ligands; spraying this solution onto a substrate that is heated to about 100 to 400° C. to form a first solid film containing the transition metal(s) on the substrate; forming a second solution comprising at least one alkali metal, at least one transition metal, and at least two ligands; spraying the second solution onto the first solid film on the substrate that is heated to about 100 to 400° C. to form a second solid film containing the alkali metal and at least one transition metal; and, heating to about 300 to 1000° C. in a selected atmosphere to react the first and second films to form a homogeneous cathode film. The cathode may be incorporated into a lithium or sodium ion battery.

7 Claims, 13 Drawing Sheets

0.5 μm

1 μm

METHOD OF FORMING A SOLID STATE CATHODE FOR HIGH ENERGY DENSITY SECONDARY BATTERIES

CROSS-REFERENCE TO RELATED APPLICATIONS

This application is related to U.S. patent application Ser. Nos. 12/151,562 filed on May 7, 2008, now U.S. Pat. No. 7,700,161, entitled "Film Growth System and Method," Ser. No. 12/151,465, filed on May 7, 2008, entitled "Zinc Oxide Film and Method of Making," Ser. No. 12/462,146, filed on Jul. 30, 2009, entitled "Method for Fabricating Cu-Containing Ternary and Quaternary Chalcogenide Thin Films," Ser. No. 12/798,519, filed on Apr. 6, 2010, entitled, "Apparatus and Method for Depositing Alkali Metals," Ser. No. 12/798,515, filed on Apr. 6, 2010, entitled "Method of Forming Solid State Electrolyte Having High Lithium Ion Conduction and Battery Incorporating Same," and Ser. No. 12/798,510, filed on Apr. 6, 2010, entitled "Solid State Electrolytes Having High Li Ion Conduction", all by the present inventor, the entire disclosures of which are incorporated herein by reference.

BACKGROUND OF THE INVENTION

1. Field of the Invention

The invention pertains to apparatus and methods for chemically depositing a solid state cathode film for alkali ion batteries.

2. Description of Related Art

Lithium (Li) ion, sodium (Na) ion, or Li—Na multi-ion secondary batteries are known to be high energy density batteries. For sufficient power, thick cathodes are employed in these batteries. Over the years these cathodes were fabricated by a series of complex and expensive techniques. These include forming nanoscale powders of active cathode material, mixing the active powder with an inert organic binder dissolved in appropriate solvent to form a slurry, using various slurry coating techniques to form the thick film of the cathode on a metallic substrate, followed by calendaring and drying processes to fully stabilize and form the cathode. Another cathode formation scheme involves mixing the cathode material (as a nano-particle powder) with the binder powder and pressing the mixture to form a pellet or a plate cathode, followed by drying. The inert binder content in these cathodes could be as high as 30% and unnecessarily lowers the power density of batteries containing them.

Several methods for making nanoscale powders of cathode materials have been disclosed:

In U.S. Pat. No. 6,350,543 or U.S. Pat. No. 7,258,821 $Li_xMn_yNi_zCo_uAl_wO_n$ cathode powder, where $0<x\leq 2$, the sum of y+z+u+w is about 1 to 2, and $2\leq n\leq 4$, and $0.7\leq y/(y+z+u+w)<1.0$ was made according to the followings steps: (a) making a solution of manganese nitrate, nickel nitrate, cobalt nitrate, and aluminum nitrate in the appropriate volumetric ratio in water; (b) adding LiOH solution to the above quaternary nitrate mixture solution to effect homogenous co-precipitation of the respective metal hydroxides; washing the precipitate to eliminate lithium nitrates; (c) slowly drying the resulting paste and oxidizing it at about 80° C. for 1 to 5 days; (d) mixing the dried oxidized precipitate with sufficient amount of LiOH, and calcining the powder at about 750° C. for about 24 hours in air to form $Li_xMn_yNi_zCo_uAl_wO_n$ cathode powder.

In U.S. Pat. No. 7,008,608 $Li[Co_xLi_{(1/3-x/3)}Mn_{(2/3-2x/3)}]O_2$ (0.05<x<0.9) cathode powder was synthesized using stoichiometric amount of lithium acetate dihydrate, lithium nitrate, manganese acetate tetrahydrate, cobalt nitrate hexahydrate dissolved in distilled water. This solution was heated at about 150° C. to form a gel. The gel was then calcined at 400° C. to remove the organic content and remaining moisture to form lumps of metal oxide. The lumps were ground into fine particles and calcined at 500° C. for about 3 hours. The resulting powder was then sintered at 1000° C. for 6 hours followed by additional grinding to form the desired cathode metal oxide powder.

In U.S. Pat. No. 5,783,333 or U.S. Pat. No. 6,379,842 lithium nickel cobalt metal oxide is described, with general formula $Li_xNi_yCo_zMO_2$, where M is selected from the group consisting of aluminum, titanium, tungsten, chromium, molybdenum, magnesium; tantalum, silicon, and combination thereof, x is between about 0 and 1, the sum of x+z+n is about 1, n ranges between 0 to about 0.25, y and z are both greater than 0, and the ratio z/y ranges from above 0 to about ⅓. The patent also disclosed $Li_xMn_{2-r}M1_rO_4$, where r is a value between 0 and 1, M1 is chromium, titanium, tungsten, nickel, cobalt, iron, tin, zinc, zirconium, silicon. $Li_xNi_yCo_zMO_2$ is formed by combining specified lithium containing compound with a specified cobalt containing compound, a specified nickel containing compound, and the specified metal (M) containing compound. The combined various components are well mixed and then thermally reacted at a temperature between about 400 and 1300° C. in oxygen ambient. The compounds of choice are the nitrate, hydroxide, acetate, or carbonate of Li, Co, Ni and M. $Li_xMn_{2-r}M1_rO_4$ is also similarly processed, but the source of Mn is preferably $MnO_2$ and the oxide of M1 or the pure metal nanoparticle of M1.

U.S. Pat. No. 5,718,989 or U.S. Pat. No. 5,795,558 describe $LiNi_{1-x-y-z}Co_xMn_yAl_zO_2$ wherein x, y, and z satisfy relations of $0\leq y\leq 0.3$, $0\leq x\leq 0.25$, $0<z\leq 0.15$. The co-precipitated $Ni_{1-x-y-z}Co_xMn_y(OH)_2$ was mixed with $Al(OH)_3$ and LiOH in the predetermined proportion, the mixture was calcined at 720° C. for 40 hours under an atmosphere of oxygen partial pressure of 0.5 atm. After calcining, these were ground to an average of 3.5 μm by ball mill to obtain $LiNi_{1-x-y-z}Co_xMn_yAl_zO_2$ cathode powder.

U.S. Pat. No. 5,589,300 discloses the generation of a more homogeneous electrode material powder consisting of particles of controlled sizes. The particles are generated by precipitation or homogeneous reaction. For example for the formation $LiMn_2O_4$ powder: $MnNO_3$ and $LiNO_3$ are dissolved in ethyl alcohol, alcohol, or water. The precursor is nebulized into aerosol or small droplets. The droplets are swept into a hot tube where solvent is driven away and the reagents in each droplet react to form $LiMn_2O_4$ particles. The particles are then collected electrostatically on a metallic collector. These particles may be further heat treated before use. The cathode film is then formed by mixing the powder with suitable organic binder to form a slurry which is applied to a metal current collector to form the film.

It is therefore clear that traditional methods of making the powder and deploying the powder to make the film are cumbersome, and more streamlined methods are needed to enable wider adoption of lithium ion batteries.

Vacuum deposition techniques, sputtering, chemical vapor deposition, Pulse Laser deposition, have been adopted to grow organic binder free inorganic cathode films. These processes are slow and expensive, and the grown films are thin, less than 5 μm. The latter are therefore suitable only for microbatteries. Adopting these processes to grow thicker film on a large area would not be economical, because the capital equipment cost or/and operation cost will be too high [see, for example, *Journal of the Electrochemical Society,* 147(2):517-23 (2000); Materials Research Bulletin 43:1913-42 (2008)].

U.S. Pat. No. 6,582,481 describes a method of producing a layer of lithium metal oxide film comprising the steps of: (a) providing a solution having a mixture of lithium (2,2,6,6-tetramethyl-3,5-heptadionate) and cobalt (III) acetyl acetanoate dissolved in an organic solvent consisting diglyme, toluene and (2,2,6,6-tetramethyl-3,5-heptadionate); (b) processing the solution to form a mist using an ultrasonicator; (c) heating the solution mist to a vapor state at around 200° C.; and (d) depositing the vapor upon a substrate heated at 400° C. Although this is a non vacuum process, the use of organometallic precursors and organic solvents will not make this process a cheap one. In addition, ultrasonic generation of the mist will make the process a slow process, hence, suitable only for micobatteries.

Similarly, Kim et al., in *Chemical Vapor Deposition* 9(4): 187-92 (2003), dissolved $LiNO_3$ and $Mn(NO_3)_2$ in 2-methoxyethanol and ethylene glycol mixed solvent. The solution was transformed into ultrafine mist by 1.65 MHz ultrasonic nebulizer. The mist was carried to the substrate by argon gas for film deposition at room temperature. The film was baked at 230° C. then 400° C. and recrystallized at about 700° C. for binder free $LiMnO_4$ cathode film formation. The process is suitable for microbatteries as the reported deposition rate was about 100 Å/minute.

Binder free cathode films have also been grown by electrostatic spray deposition. Here, the solution consisting of lithium salt and metal salt dissolved in ethanol or ethanol and butyl carbitol mixture is pumped to a metallic capillary nozzle. A DC voltage above 5 kV applied between the metallic nozzle and the heated metallic substrate generates a mist by electrohydrodynamic force. The electrostatic force then moves the mist to the hot substrate at temperature between 240 to 450° C. where the film gets deposited by pyrolysis of the mist. About 1 to 5 μm thick film could be deposited by this technique per hour, therefore very suitable for microbatteries. [See, for example, C. H. Chen et al.; *Solid State Ionics;* 86-88:1301-06 (1996).]

Objects and Advantages

Objects of the present invention include the following: providing a method for making a solid state cathode having high energy density; providing a method for making a solid state cathode by depositing a precursor mixture that may be heat treated to create a final cathode composition; providing a method for assembling an all solid state lithium battery; providing an improved solid state alkali ion battery; and, providing a manufacturing friendly and an improved solid state lithium battery. These and other objects and advantages of the invention will become apparent from consideration of the following specification, read in conjunction with the drawings.

SUMMARY OF THE INVENTION

According to one aspect of the invention, a method of forming a solid state cathode comprises the steps of:
 a) forming a generally planar substrate;
 b) forming a substantially alkali-free first solution comprising at least one transition metal and at least two ligands;
 c) spraying the first solution onto the substrate while maintaining the substrate at a temperature between about 100 and 400° C. to form a first solid film containing the transition metal(s) on the substrate;
 d) forming a second solution comprising at least one alkali metal, at least one transition metal, and at least two ligands;
 e) spraying the second solution onto the first solid film on the substrate while maintaining the substrate at a temperature between about 100 and 400° C. to form a second solid film containing the alkali metal and at least one transition metal; and,
 f) heating to a temperature between about 300 and 1000° C. in a selected atmosphere to react the first and second films to form a homogeneous cathode film.

According to another aspect of the invention, method of forming a Li ion battery comprises the steps of:
 a) forming a generally planar metallic cathode current collector;
 b) forming a substantially alkali-free first solution comprising at least one transition metal and at least two ligands;
 c) spraying the first solution onto the current collector while maintaining the current collector at a temperature between about 100 and 400° C. to form a first solid film containing the transition metals) on the current collector;
 d) forming a second solution comprising at least one alkali metal, at least one transition metal, and at least two ligands;
 e) spraying the second solution onto the first solid film on the substrate while maintaining the substrate at a temperature between about 100 and 400° C. to form a second solid film containing the alkali metal and at least one transition metal; and,
 f) heating to a temperature between about 300 and 1000° C. in a selected atmosphere to react the first and second films to form a homogeneous cathode film;
 g) depositing a solid state electrolyte on the cathode film;
 h) depositing a Li metal anode on the solid electrolyte; and,
 i) providing a generally planar metallic anode current collector in contact with the Li metal anode.

According to another aspect of the invention, a method of forming a Li ion battery comprises the steps of:
 a) forming a generally planar metallic cathode current collector;
 b) forming a substantially alkali-free first solution comprising at least one transition metal and at least two ligands;
 c) spraying the first solution onto the current collector while maintaining the current collector at a temperature between about 100 and 400° C. to form a first solid film containing the transition metal(s) on the current collector;
 d) forming a second solution comprising at least one alkali metal, at least one transition metal, and at least two ligands;
 e) spraying the second solution onto the first solid film on the substrate while maintaining the substrate at a temperature between about 100 and 400° C. to form a second solid film containing the alkali metal and at least one transition metal; and,
 f) heating to a temperature between about 300 and 1000° C. in a selected atmosphere to react the first and second films to form a homogeneous cathode film;
 g) disposing a polymeric separator on the cathode film;
 h) disposing an anode material on the opposite side of the separator from the cathode film to form a cell;
 i) placing the cell in a container with leads attached to the anode and cathode;
 j) filling the container with a Li ion conductive liquid electrolyte; and,
 k) sealing the container.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
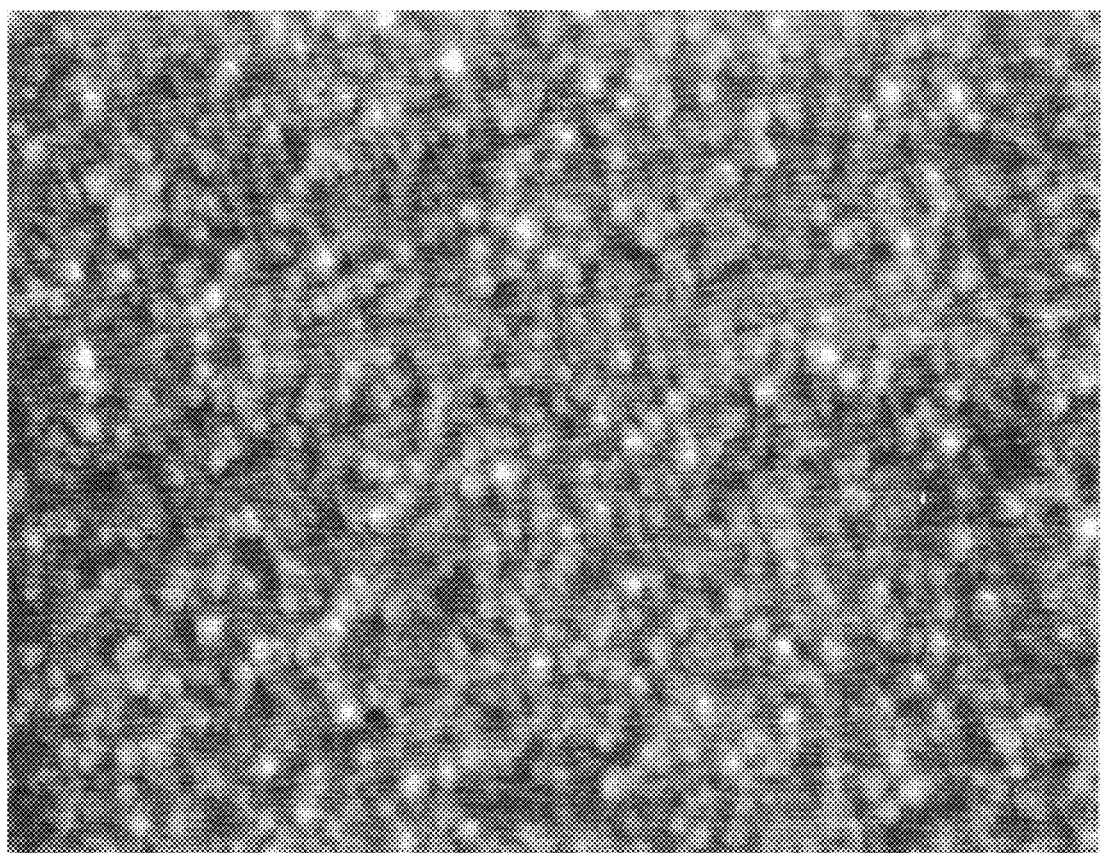
FIG. 1 is an SEM image of the surface of a SPEED grown MnO film showing densely packed nanoparticles constituting the film.

This invention is directed to the growth of thin or thick binder free cathode film on metallic substrate at fast rate (typically more than 1 μm/minute) for secondary lithium or sodium ion batteries where the growth starts from atomic level mixing of most of the constituent elements sourced from readily available primary reagents. The reagents are primary inorganic chemicals, preferably water soluble. A clear solution is formulated by dissolving the reagents in an appropriate solvent, preferably deionized water, and complexing all the metallic ions with appropriate multiple ligands to suppress homogeneous nucleation or precipitation. Two kinds of solution are formulated: the non-lithium containing or non-sodium containing solution (NLS or NSS) and lithium containing or sodium containing solution (LS or SS). The NLS or NSS solution is used in growing the first layer on a heated substrate at 100 to 400° C. using spray deposition system, preferably a form of the "Vapor Phase Streaming Process, for Electroless Electrochemical Deposition" (VPSPEED) system or "Liquid Phase Streaming Process for Electroless Electrochemical Deposition" (LPSPEED) system as described in detail in Applicant's co-pending U.S. patent application Ser. No. 12/462,146 and U.S. Pat. No. 7,700,161. The second layer is then deposited on the first layer using LS or SS solution by VPSPEED. The LS or SS solution are used to deposit a second layer containing the stoichiometric amount of Li or Na needed so that the homogenized two layers (after anneal) will form a single uniform Li or Na containing cathode film of a desired target composition. The deposited film is then thermally processed, at temperatures preferably ranging between 300 and 1000° C. in air or oxygen ambient, to obtain a homogenized and fully recrystallized cathode film on the metallic current collector substrate.

Some cathode materials of interest include $LiMn_2O_4$, $LiMn_{2-x}M_xO_4$ (where M is Al, Fe, Zn, Cr, or Sn, etc.), $LiCoO_2$, $LiNiO_2$, $LiMn_{(1-x-y-z)}Ni_xCo_yAl_zO_2$, and $LiFePO_4$. Several cathode compositions and the reagents and process conditions to produce them will be illustrated in detail In the examples that follow, which are exemplary only and are not intended to limit the scope of the invention as claimed.

The primary chemicals used to formulate the starting solutions are preferably the acetate, sulfate, chloride, citrate, or nitrate, of Mn, Li, Co, Ni, Al, Fe, Sn, etc., as the source for the metallic ions of these metals; urea as ligand and source of oxygen; acetic acid, citric acid, hydrochloric acid, sulfuric acid, nitric acid, lithium citrate, sodium citrate, triethanolamine, ethylenediamine, ammonia, nitrilotriacetic acid, or acetonitrile as additional ligand; water as the source of hydroxyl ions, and phosphoric acid as the source of phosphate. These chemicals are mixed together in the desired proportion in deionized water to form a clear stable solution. Also added to this solution is 5 to 10 volume % of ethanol, or methanol, or methoxy-propanol to ensure the mist droplet sizes are less than 10 μm. The solution is spray deposited on a heated substrate to form a binder free thin or thick cathode using the aforementioned LPSPEED and/or VPSPEED process. Post growth, prior to annealing, the grown films may be compacted, if desired, to eliminate the pores in the film by calendaring.

The electronic and ionic conductivity of the cathode film can be enhanced to improve the battery performance. For electronic conductivity enhancement this may be done by the in-situ addition of well dispersed nano-particle size graphene or carbon nano-tube in the growth solution. Here, the cathode film is grown with highly conducting graphene nano-particles or carbon nano-tubes imbedded in the film; about 1 to 5 weight % of graphene or carbon nano-tubes is typical. Ionic conductivity enhancement is achieved by stuffing the grain boundaries of the cathode film post anneal with $Li_3N$. Here, Li is first deposited on the fully formed cathode by vacuum evaporation or by Field Enhanced VPSPEED (FEVPSPEED) as taught in Applicant's co-pending U.S. patent application Ser. No. 12/798,515. The lithium readily diffuses into the grain boundaries. This is then followed by low temperature anneal at about 100° C. in nitrogen ambient to form $Li_3N$. On the other hand, up to 0.5 μm of $LiW_xPO_4$ film can also be deposited by VPSPEED after every 5 μm of cathode film deposition. Post processing the interpenetrating $LiW_xPO_4$ layers in the cathode help improve both the electronic and ionic conductivity of the cathode.

Example

As discussed in detail in Applicant's co-pending applications, the substrate needs to be hydrophilic, to enable the controlled hydroxyl ions (OH⁻) in the growth bath (LPSPEED) or droplet (VPSPEED) to adhere to the substrate. The OH⁻ attachment sites on the substrate are the nucleation sites, and there are typically more than $10^{12}$ of these sites per cm². The heterogeneous reactions at the OH⁻ site that will eventually lead to the formation of the desired molecule occur only if the substrate temperature is able to supply at least the activation energies of the reactions. Once this condition is met the formation of the first molecule at a particular site is followed by site regeneration that results in new OH⁻ attachment and then the formation of the subsequent molecule, continuing on to form a grain. The lateral growth of these grains on the substrate is short-lived as there are millions of these occurring simultaneously until the available surface area is consumed. The film is made up of densely packed grains with lateral sizes in the nano range as shown in FIG. 1. Here, the grains range from 50 to 100 nm. For the cathode, post growth annealing is required to form the desired phase of the material and recrystallize the nanoparticles into bigger grains. SPEED has been used to directly deposit nanoparticle based films at a very fast rate on metallic, glass, and plastic substrates; and it is readily scalable. SPEED, therefore, offers a very economical path to industrial deposition of nanoparticle films without any organic binders.

Example

Using the SPEED process, a film of MnO was grown on a metal substrate under the following conditions: manganese nitrate 0.15M, urea 0.15M, nitrilotriacetic acid 0.1M, nitric acid 0.2M, in deionized water with about 5% volume of ethanol, substrate temperature 250° C., deposition time 10 second, growth rate about 1 μm/minute. An SEM image of the as-grown film is shown in FIG. 1.

Figure 2:
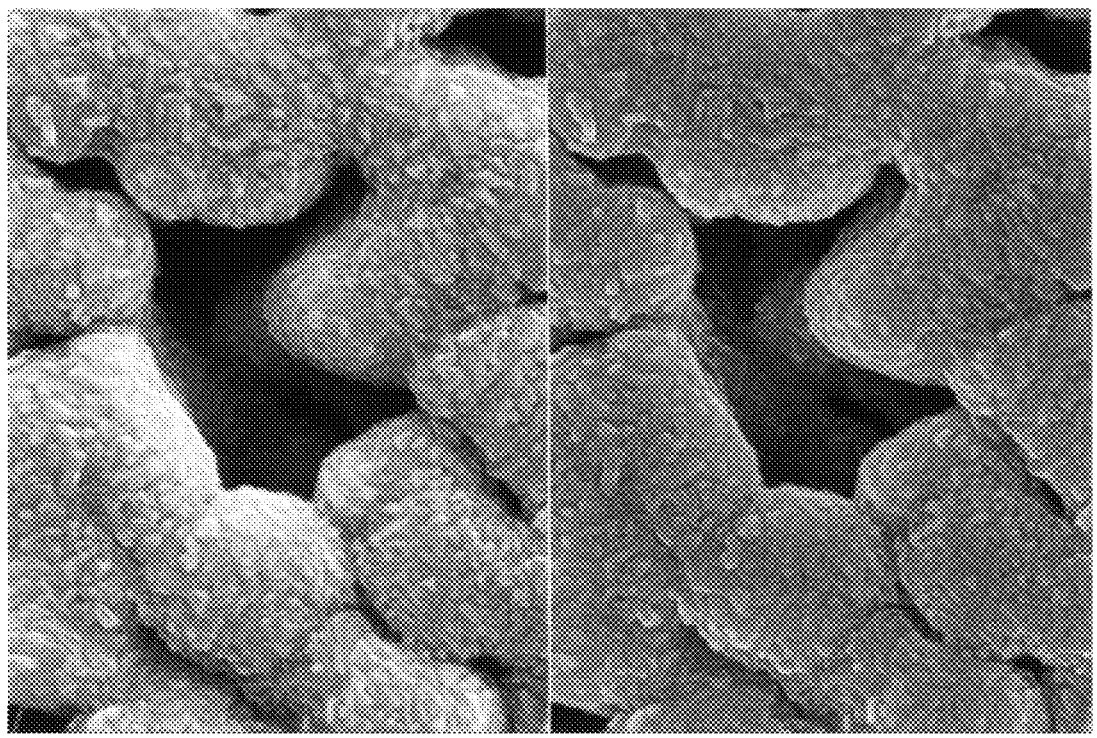
FIG. 2 is an SEM image of a fully formed $LiMn_2O_4$ cathode after annealing the dual MnO/LiMnO layers, showing some pores.

The MnO film then formed the substrate for a second film of LiMnO, deposited by the SPEED process under the following conditions: manganese nitrate 0.1M, lithium nitrate 0.06M, urea 0.2M, acetonitrile 0.1M, nitric acid 0.1M, in deionized water with about 5% volume of ethanol, substrate temperature 260° C., deposition time 2 minutes, growth rate about 1 μm/minute. The resulting two-layer film was then annealed at 400° C. for 20 minutes, then 700° C. for 10 minutes, in oxygen ambient to form a $LiMn_2O_4$ cathode layer, shown in the SEM image in FIG. 2. The overall process sequence is shown schematically in FIG. 3.

Figure 5:
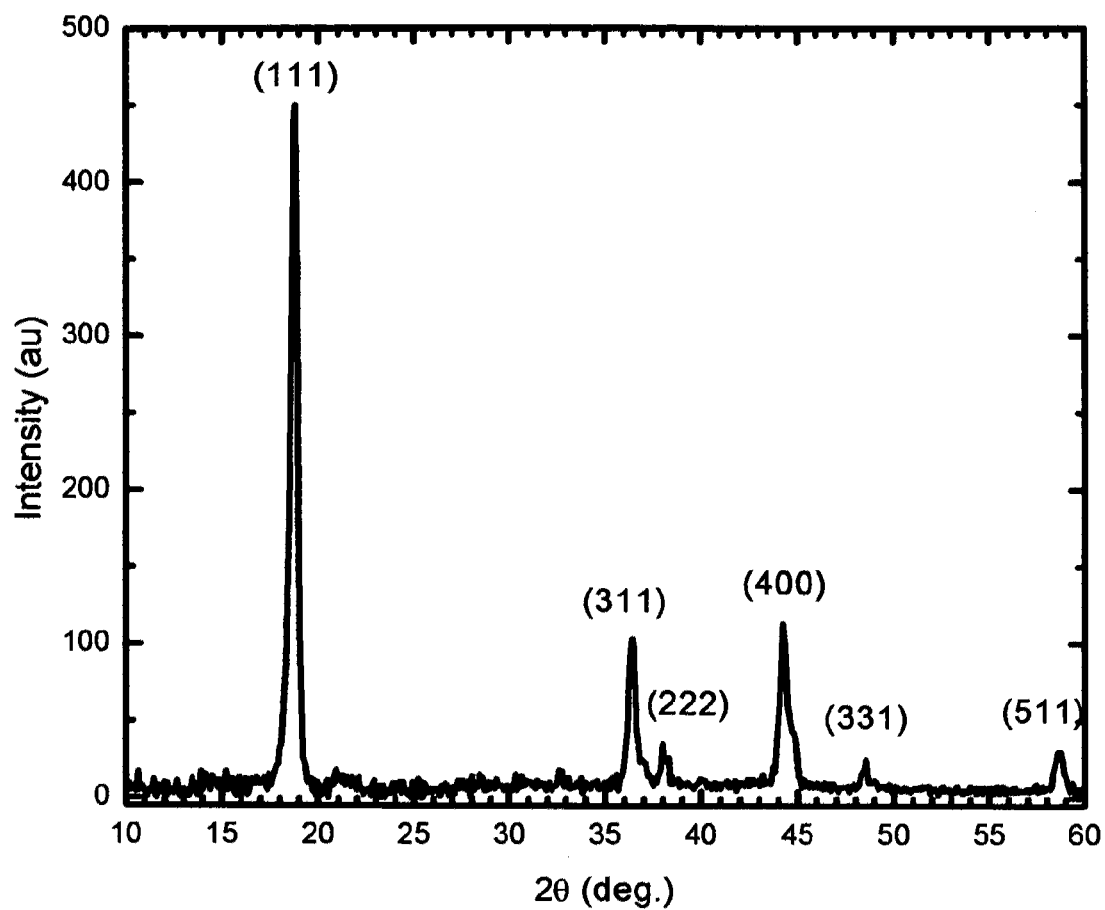
FIG. 5 is an XRD pattern of a $LiMn_2O_4$ film grown according to the present invention.

The X-ray diffraction pattern of the cathode film, FIG. 5, confirms that the desired $LiMn_2O_4$ phase has been farmed.

Example

Figure 6:
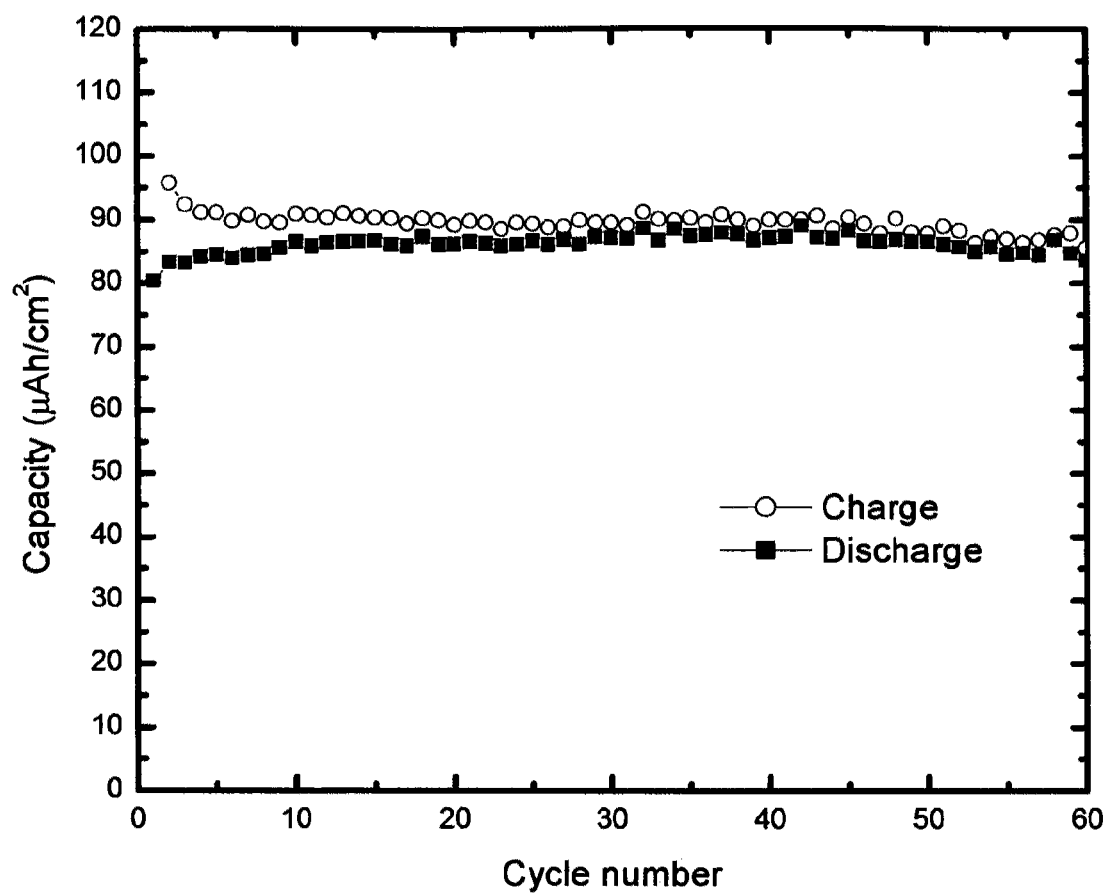
FIG. 6 is a plot of charge/discharge capacity versus cycle for a cell with a SPEED-grown $LiMn_2O_4$ cathode.

A cell was constructed using a cathode grown as described in the foregoing example on stainless steel (SS) substrate. A 2 μm thick LIPON solid state electrolyte was deposited on the cathode by sputtering followed by TiN/Cu as the anode current collector. The "SS/$LiMn_2O_4$/LIPON/TiN/Cu" was then charged and discharged at 1 C rate. C rate is generally defined as [charge or discharge current (A) divided by battery capacity (Ah)] or hourly rate. 1 C rate, in other words, means, if the battery capacity is 1 mAh and one supplies 1 mA, one should be able to charge it in 1 hour; and if one draws 1 mA, one should be able to discharge it in 1 hour. The charge/discharge capacity, measured at around 80 μAh/cm², showed no capacity fade after 60 charge/discharge cycles, as shown in FIG. 6.

Figure 7:
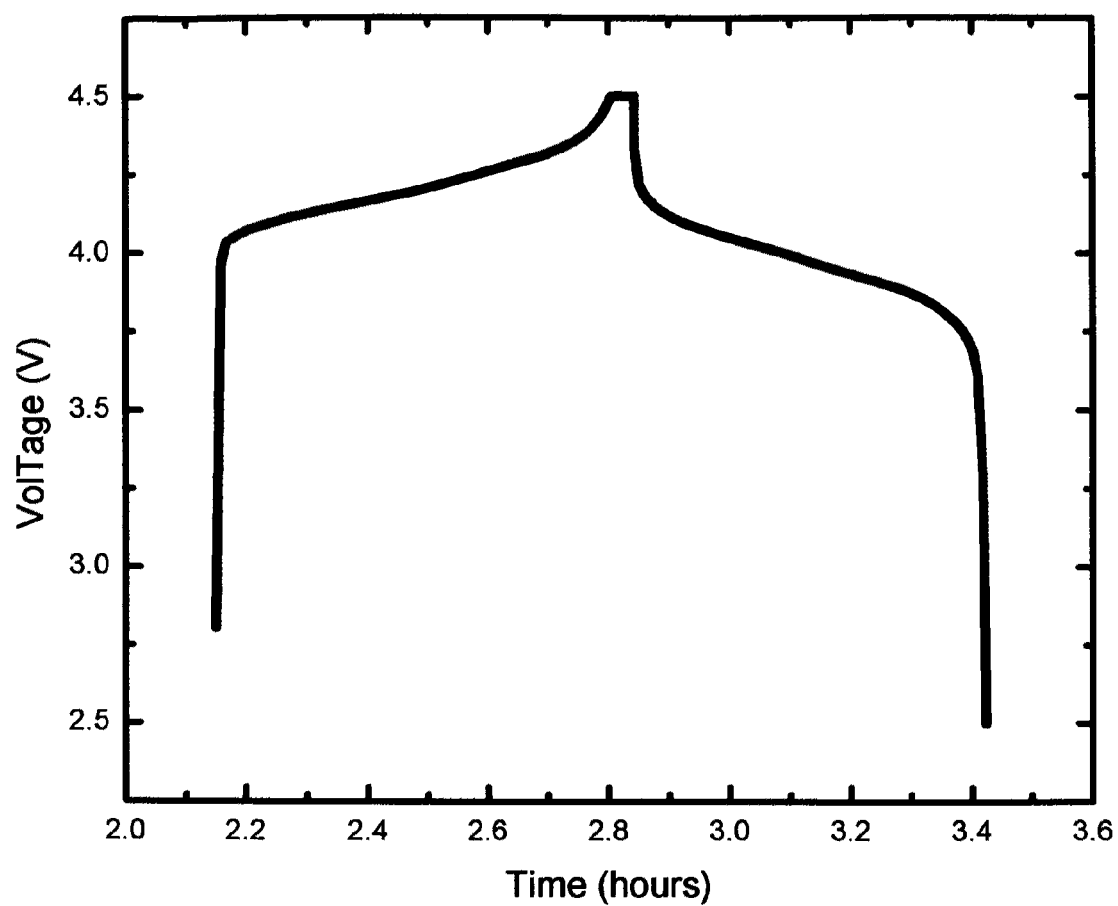
FIG. 7 is a plot of charge/discharge voltage in one cycle versus time for the same cell used in FIG. 6.

The charge/discharge voltage profile of the cell is shown in FIG. 7. This shows that the charging occurs mostly between 4 to about 4.3 V and the discharge occurs mostly between 4.2 and 3.8 V.

Example

Figure 3:
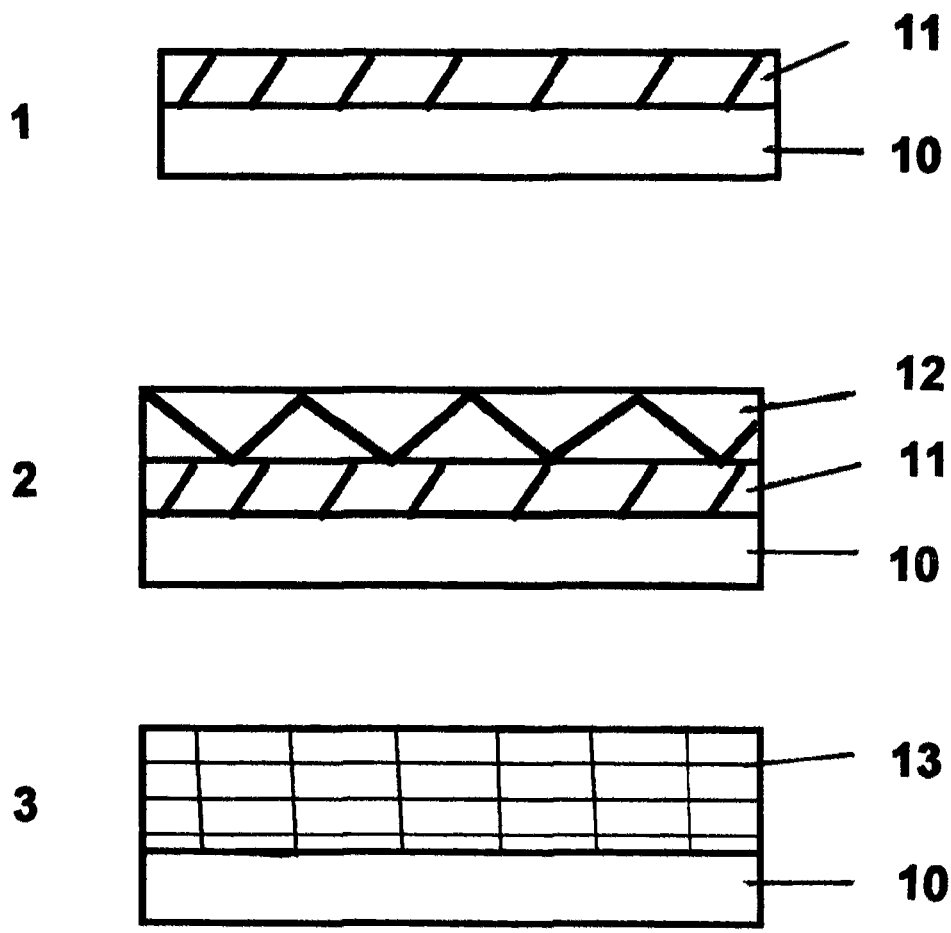
FIG. 3 is a schematic illustration of a process sequence used to form a solid cathode according to one aspect of the invention.

The process sequence shown in FIG. 3 may be further described as follows: Step 1. deposition of non-lithium-containing layer 11 on substrate 10; Step 2. deposition of lithium-containing layer 12 on top of layer 11 (some Li diffusion occurs during this operation); Step 3. homogenization and recrystallization of the layers by annealing at a temperature between 300 and 1000° C. in oxygen to form a finished cathode 13.

Example

Figure 4:
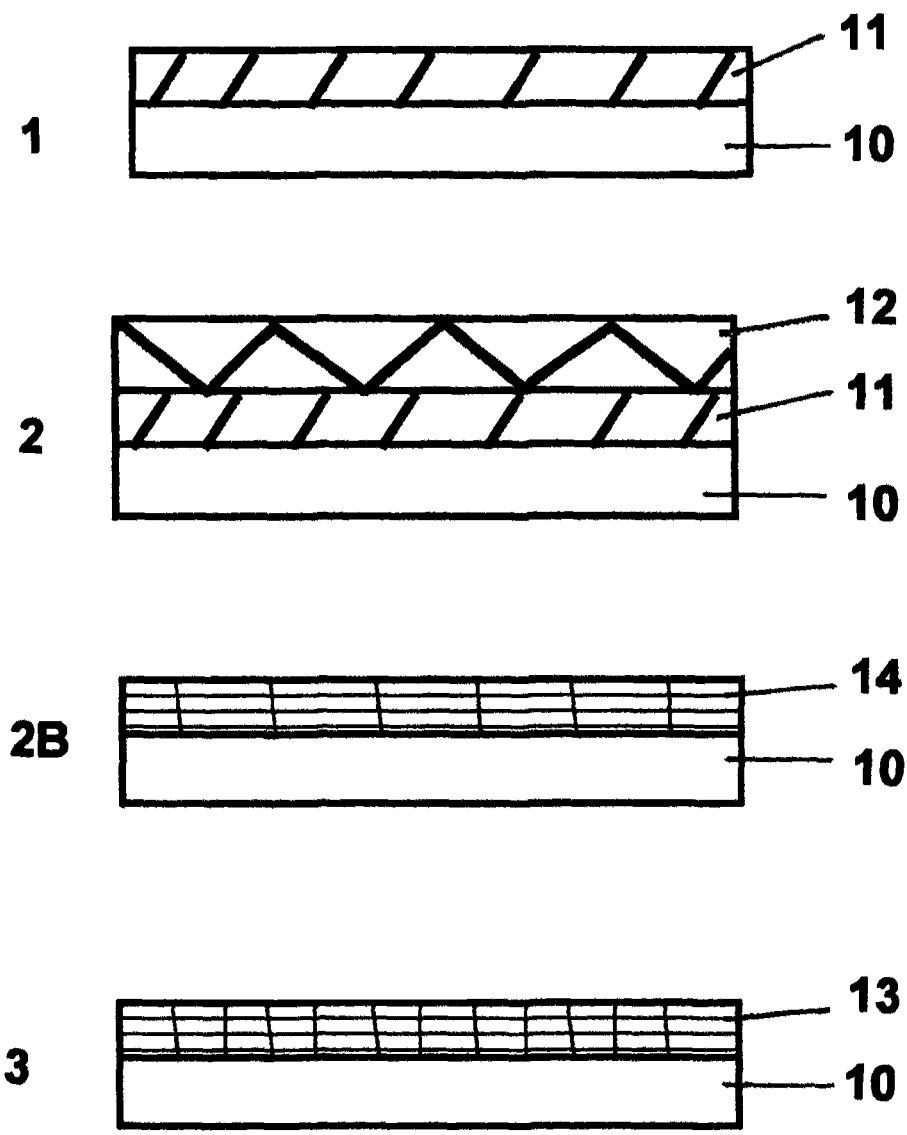
FIG. 4 is a schematic illustration of a process sequence used to form a solid cathode according to another aspect of the invention.

An alternate process sequence shown schematically in FIG. 4 may be described as follows: Step 1. deposition of non-lithium-containing layer 11 on substrate 10; Step 2. deposition of lithium-containing layer 12 on top of layer 11 (some Li diffusion occurs during this operation); Step 2B. mechanical calendaring at more than 2000 psi to reduce porosity in the as-grown film and create a densified film 14; Step 3. homogenization and recrystallization of the densified film by annealing at a temperature between 300 and 1000° C. in oxygen to form a finished cathode 13.

Example

Another cathode composition of interest is represented by the nominal composition $LiMn_{2-x}Al_xO_4$. Using the SPEED process, a film of MnO was grown on a metal substrate under the following conditions: manganese nitrate 0.15M, urea 0.15M, nitrilotriacetic acid 0.1M, nitric acid 0.2M, in deionized water with about 5% volume of ethanol, substrate temperature 250° C., deposition time 10 second, growth rate about 1 μm/minute.

The MnO film then formed the substrate for a second film of LiMnAlO, deposited by the SPEED process under the following conditions: manganese nitrate 0.1M, lithium nitrate 0.06M, aluminum nitrate 0.005M, urea 0.2M, citric acid 0.10, in deionized water with about 5% volume of ethanol, substrate temperature 250° C., deposition time 10 minutes, growth rate about 1 μm/minute. The resulting two-layer film was then annealed at 400° C. for 20 minutes, then 700° C. for 10 minutes, in oxygen ambient to form a $LiMn_{2-x}Al_xO_4$ cathode layer. As in the previous example, the overall process sequence is shown schematically in FIG. 3.

Figure 8:
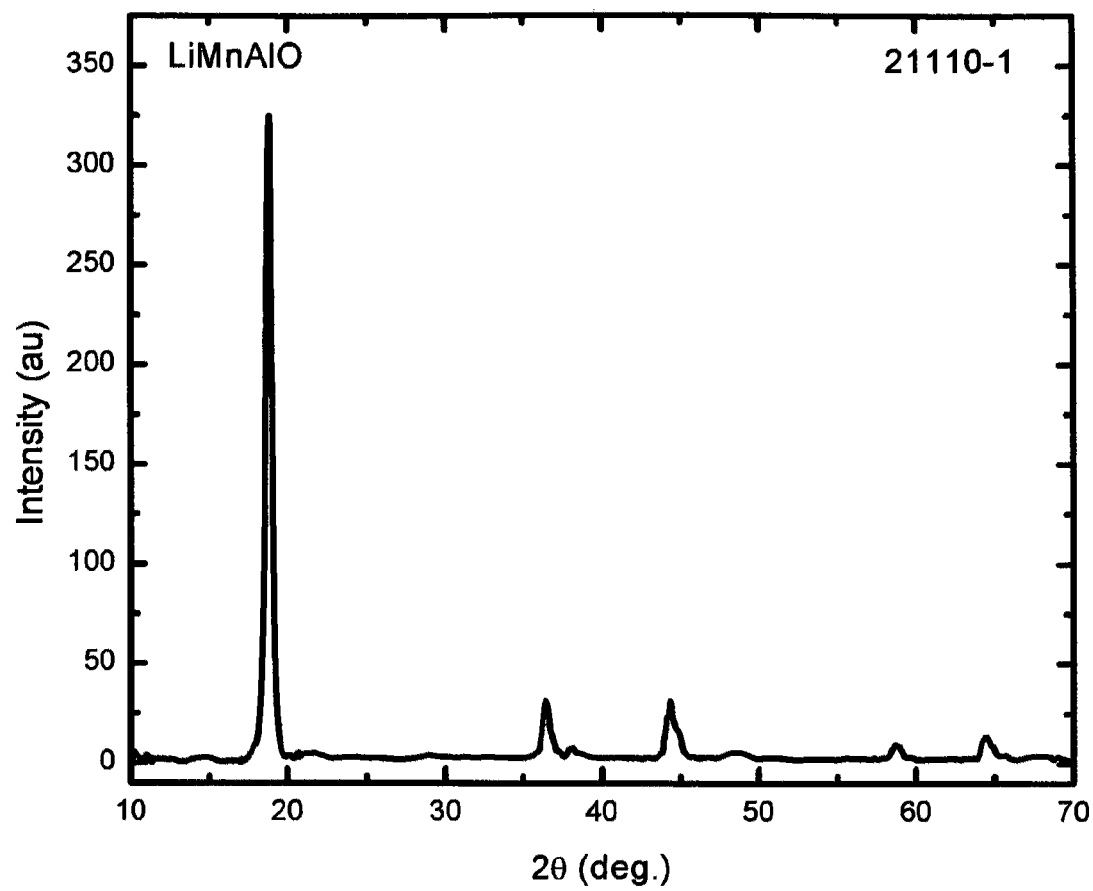
FIG. 8 is an XRD pattern of a $LiMn_{2-x}Al_xO_4$ film grown according to the present invention.

The X-ray diffraction pattern of the cathode film, FIG. 8, confirms that the desired $LiMn_{2-x}Al_xO_4$ phase has been formed.

Example

Figure 9:
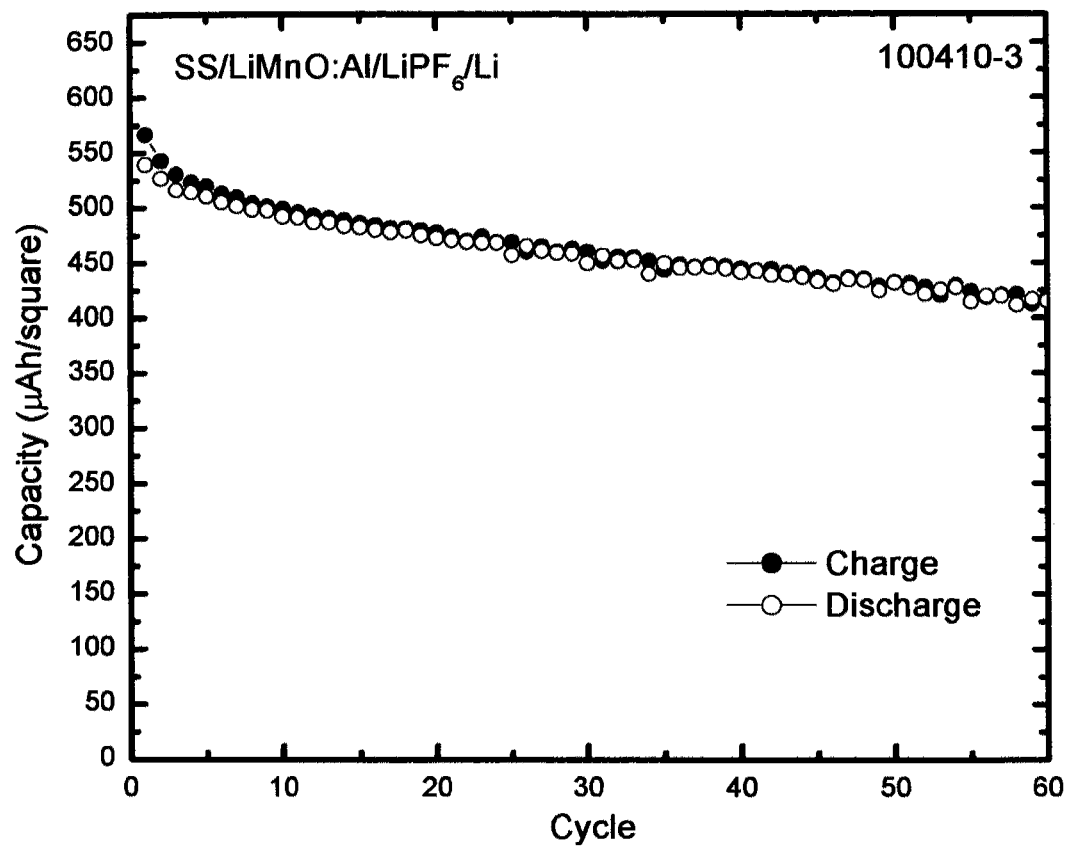
FIG. 9 is a plot of charge/discharge capacity versus cycle for a cell with a SPEED-grown $LiMn_{2-x}Al_xO_4$ cathode.

A cell was constructed using a cathode grown as described in the foregoing example on stainless steel foil (SS) that will also act as the cathode current collector. A polymer separator was placed on the cathode/SS substrate followed by Li foil acting as anode and anode current collector. This assembly was placed in a pouch with appropriate leads and soaked with $LiPF_6$ liquid electrolyte then sealed to form "SS/$LiMn_{2-x}Al_xO_4$/LiPF6/Li" cell. The cell was charged/discharged at 1 C rate. The measured initial charge/discharge capacity was about 140 μAh/cm²; with minor capacity fade after 60 charge/discharge cycles, as shown in FIG. 9.

Figure 10:
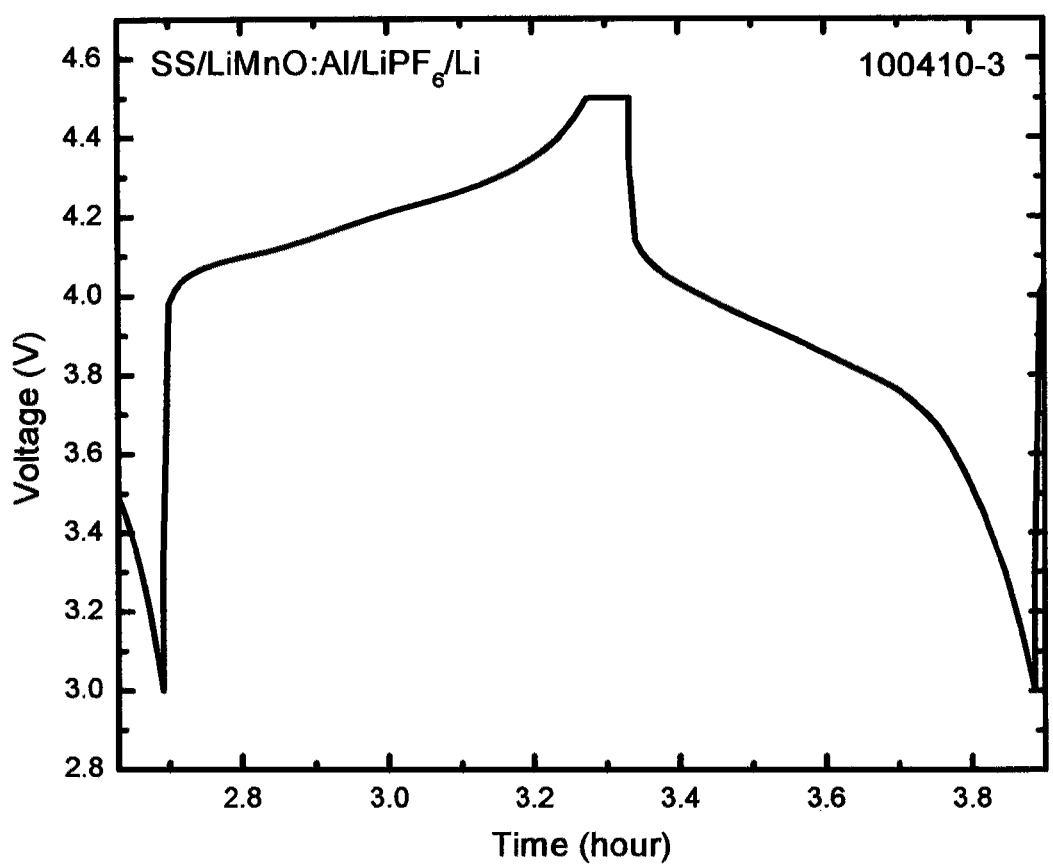
FIG. 10 is a plot of charge/discharge voltage in one cycle versus time for the same cell used in FIG. 9.

As shown in FIG. 10, the charge/discharge voltage profile of the cell is between 3 and 4.5 V. This shows that charging takes place mostly between 4 to 4.4 V and discharging mostly between 4.1 to 3 V for the liquid electrolyte cell.

Example

Another cathode composition of interest is represented by the nominal composition Li(MnNiCoAl)O$_2$. Using the SPEED process, a film of MnO was grown on a heated stainless steel substrate under the following conditions: manganese nitrate 0.15M, urea 0.15M, nitrilotriacetic acid 0.1M, nitric acid 0.2M, in deionized water with about 5% volume of ethanol, substrate temperature 250° C., deposition time 10 seconds, growth rate about 1 µm/minute.

The MnO film then formed the substrate for a second film of Li(MnNiCoAl)O$_2$, deposited by the SPEED process under the following conditions: manganese nitrate 0.105M, lithium nitrate 0.15M, nickel nitrate 0.03M, cobalt nitrate 0.0075M, aluminum nitrate 0.0075M, urea 0.3M, nitrilotriacetic acid 0.1M, nitric acid 0.2M, in deionized water with about 5% volume of ethanol, substrate temperature 260° C., deposition time 10 minutes, growth rate about 1 µm/minute. The resulting two-layer film was then annealed at 400° C. for 20 minutes, then 700° C. for 10 minutes, in oxygen ambient to form a Li(MnNiCoAl)O$_2$ cathode layer. As in the previous example, the overall process sequence is shown schematically in FIG. 3.

Figure 11:
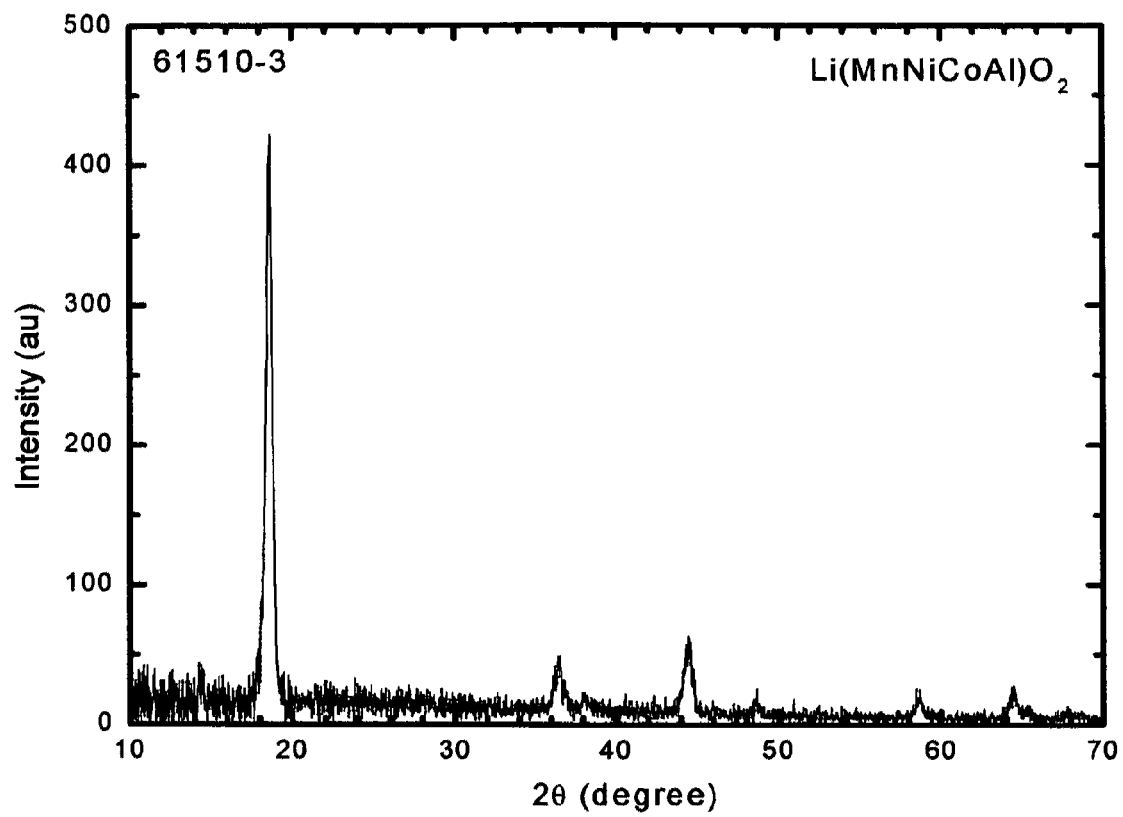
FIG. 11 is an XRD pattern of a $Li(MnNiCoAl)O_2$ film grown according to the present invention.

The X-ray diffraction pattern of the cathode film, FIG. 11, confirms that the desired Li(MnNiCoAl)O$_4$ phase has been formed.

Example

Figure 12:
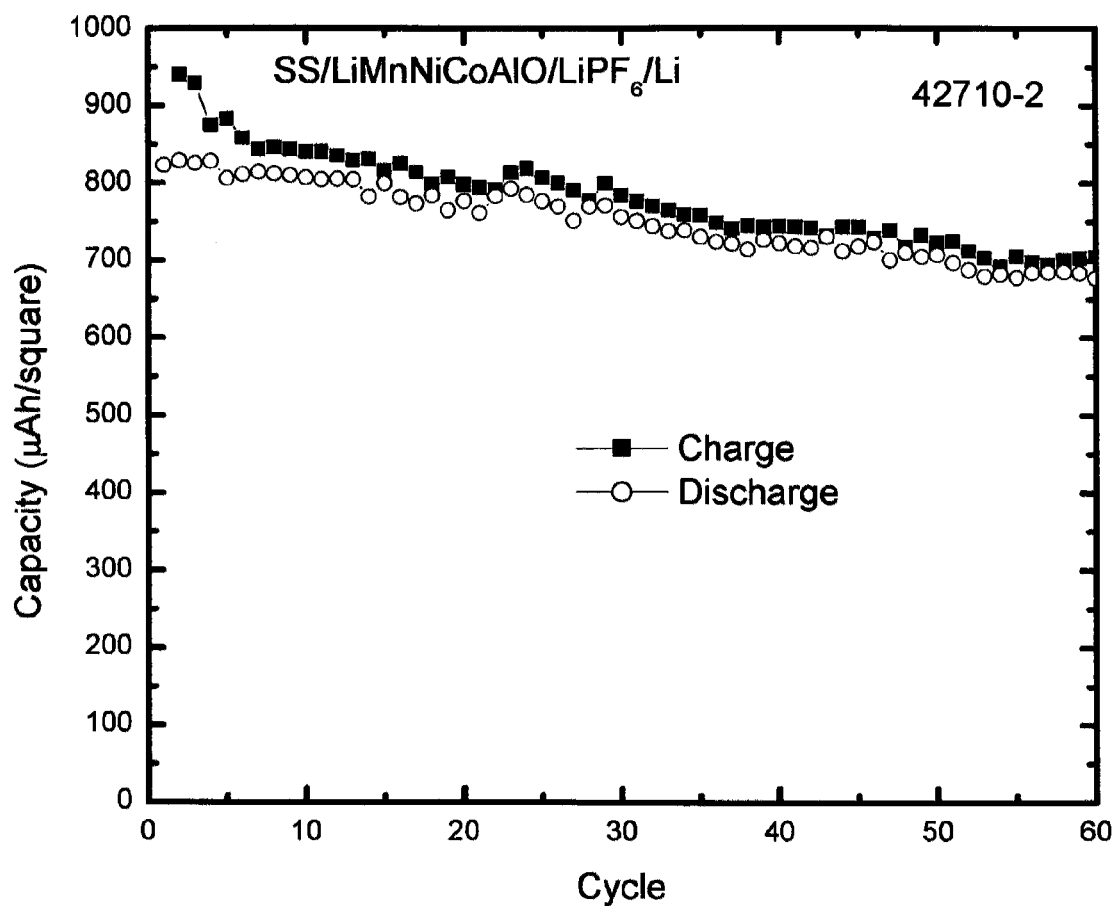
FIG. 12 is a plot of charge/discharge capacity versus cycle for a cell with a SPEED-grown $Li(MnNiCoAl)O_2$ cathode.

A cell was constructed using a cathode grown as described in the foregoing example on stainless steel foil (SS) that will also act as the cathode current collector. A polymer separator was placed on the cathode/SS substrate followed by Li foil acting as anode and anode current collector. This assembly was placed in a pouch with appropriate leads and soaked with LiPF$_6$ liquid electrolyte then sealed to form "SS/Li(MnNiCoAl)O$_2$/LiPF$_6$/Li" cell. The cell was charged/discharged at 1 C rate. The measured initial charge/discharge capacity was about 225 µAh/cm$^2$, with about 6% discharge capacity fade after 60 charge/discharge cycles, as shown in FIG. 12.

Figure 13:
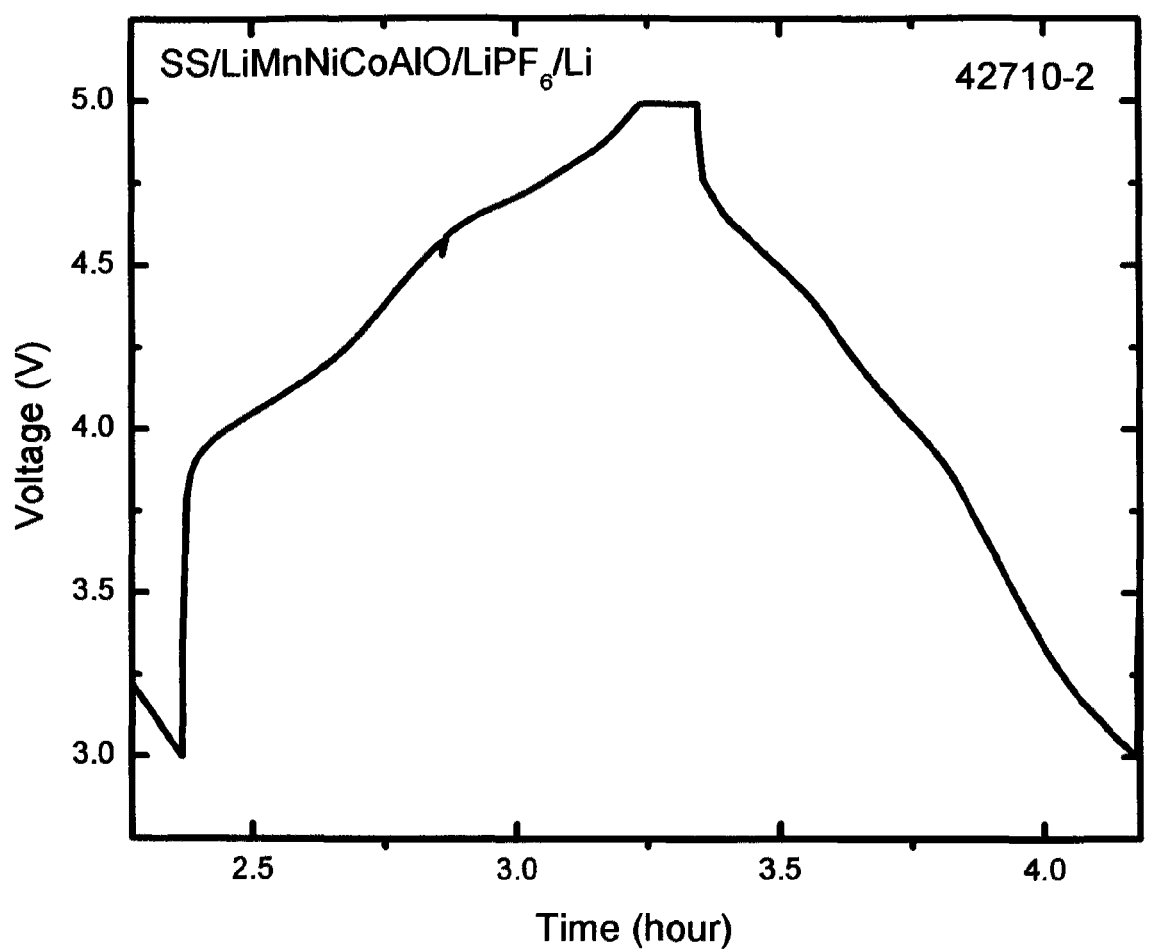
FIG. 13 is a plot of charge/discharge voltage in one cycle versus time for the same cell used in FIG. 12.

Shown in FIG. 13, is the charge/discharge voltage profile of the cell between 3 and 5 V. This shows that charging takes place mostly between 4 to 5 V and discharging mostly between 4.7 to 3 V for the liquid electrolyte cell.

Those skilled in the art will appreciate that the overall composition may be manipulated over a useful range by choice of the reagents used, and by varying their relative proportions. Applicant contemplates that useful cathode compositions include at least the following:

compounds having the composition LiMn$_{2-x}$M$_x$O$_4$ where M is Al, Sn, Zn, Fe etc., and $0 \leq x \leq 0.05$;
compounds having the composition LiCo$_{1-x}$M$_x$O$_2$ where M is Ni, Al, etc., and $0 \leq x \leq 0.5$;
compounds having the composition LiNi$_{1-x}$M$_x$O$_2$ where M is Co, Al, etc., and $0 \leq x \leq 0.5$;
compounds having the composition LiMn$_x$Ni$_y$Co$_z$Al$_t$O$_2$ where x+y+z+t=1, and $0 \leq $ (x, y, z, or t) $\leq 1$;
compounds having the composition LiMPO$_4$ where M is Fe, Co, Ni, or Mn or the combination any of these elements;
compounds having the composition NaMn$_{2-x}$M$_x$O$_4$ where M is Al, Sn, Zn, Fe etc., and $0 \leq x \leq 0.5$;
compounds having the composition NaCo$_{1-x}$M$_x$O$_2$ where M is Ni, Al, etc., and $0 \leq x \leq 0.5$;
compounds having the composition NaNi$_{1-x}$M$_x$O$_2$ where M is Co, Al, etc., and $0 \leq x \leq 0.5$;
compounds having the composition NaMn$_x$Ni$_y$Co$_z$Al$_t$O$_2$ where x+y+z+t=1, and $0 \leq $ (x, y, z, or t) $\leq 1$;
compounds having the composition NaMPO$_4$ where M is Fe, Co, Ni, or Mn or the combination any of these elements.

Example

The content of some suitable aqueous reagent solutions for making the foregoing cathode compositions are similar to those taught in the preceding examples and follow certain rules based on the stoichiometry of the target cathode material. The ratio of the concentration of the sources of the elements constituting the material with respect to each other in the solution is same as that of the mole ratio of the elements in the target material stoichiometry. The sum of the concentration of the ligands (at least two different ligands) in the solution must be at least two times or at most six times the sum of the concentration of metallic ion sources excluding lithium or sodium in the solution.

It will be clear from consideration of the foregoing example that the inventive process may be modified in various ways by the skilled artisan through routine experimentation. For example, the heat treatment may be done in any selected atmosphere based on the target compound. Suitable atmospheres include oxygen and oxygen-containing gas mixtures, argon and argon-containing gas mixtures, and various argon-oxygen mixtures.

Building on the foregoing examples, the invention may be further extended to fabricate an all solid-state Li ion battery in several ways, as described in the following example.

Example

The cathodes made in the foregoing examples on the current collector then become substrates for the fabrication of either of the following cell types:

(a) All solid state battery cells. Here, the solid state electrolyte is deposited by VPSPEED, or vacuum sputtering, or any other methods on the cathode; followed by lithium metal deposition as anode, then TiN/Cu or stainless steel as the anode current collector to complete the cell. Other kinds of anodes such as SnO, or Si deposited on Cu substrate can also be glued to the cathode/electrolyte substrate using lithium ion conducting glue to complete the cell.

(b) Liquid electrolyte battery cells. Here, the grown cathode, a polymer separator, and an anode are assembled in a container or pouch with appropriate leads attached to the current collectors. The container or pouch is then filled with the liquid electrolyte and sealed to complete the cell.

For simplicity, the foregoing examples depict a single substrate of some fixed dimensions. However, Applicant emphasizes that the invention may also be carried out in a semi-continuous or reel-to-reel format in which the substrate or current collector is a substantially continuous, flexible sheet, which is indexed through the deposition environment in a step-wise manner so that many thin-film cells may be fabricated efficiently and later diced into individual cells if desired. The substrate may have a physical support directly under the area being coated, or it may be supported in tension simply by passing it over two appropriately positioned rollers. A reel-to-reel setup is taught in detail in Applicant's co-pending U.S. patent application Ser. Nos. 12/151,562 and 12/151,465.

Furthermore, Applicant contemplates that many suitable substrate materials exist, and the skilled artisan may choose a material based on the required mechanical properties, electrical conductivity, and compatibility with the various materials and process conditions being used. Some suitable substrates include stainless steel foil, nickel foil, nickel-clad copper foil, and aluminum foil.

I claim:

1. A method of forming a solid state cathode comprising the steps of:
   a) forming a generally planar substrate;
   b) forming a substantially alkali-free first solution comprising at least one transition metal and at least two ligands;
   c) spraying said first solution onto said substrate while maintaining said substrate at a temperature between about 100 and 400° C. to form a first solid film containing said transition metal on said substrate;
   d) forming a second solution comprising at least one alkali metal, at least one transition metal, and at least two ligands;
   e) spraying said second solution onto said first solid film on said substrate while maintaining said substrate at a temperature between about 100 and 400° C. to form a second solid film containing said alkali metal and at least one transition metal; and,
   f) heating to a temperature between about 300 and 1000° C. in a selected atmosphere to react said first and second films to form a homogeneous cathode film.

2. The method of claim 1 wherein said first solution comprises:
   at least one transition metal selected from the group consisting of: Mn, Co, Ni, Al, Fe, and Sn; and,
   at least two ligands selected from the group consisting of: urea, acetic acid, citric acid, hydrochloric acid, sulfuric acid, nitric acid, lithium citrate, sodium citrate, triethanolamine, ethylenediamine, ammonia, nitrilotriacetic acid, phosphoric acid, and acetonitrile.

3. The method of claim 1 wherein said second solution comprises:
   an alkali metal selected from the group consisting of: Li and Na;
   at least one transition metal selected from the group consisting of: Mn, Co, Ni, Al, Fe, and Sn; and,
   at least two ligands selected from the group consisting of: urea, acetic acid, citric acid, hydrochloric acid, sulfuric acid, nitric acid, lithium citrate, sodium citrate, triethanolamine, ethylenediamine, ammonia, nitrilotriacetic acid, and acetonitrile.

4. The method of claim 1 wherein said substrate is selected from the group consisting of: stainless steel foil, nickel foil, nickel-clad copper foil, and aluminum foil.

5. The method of claim 1 wherein said homogeneous cathode film comprises a compound selected from the group consisting of:
   $LiMn_{2-x}M1_xO_4$ where M1 is selected from the group consisting of Al, Sn, Zn, and Fe, and $0 \leq x \leq 0.05$;
   $LiCo_{1-x}M2_xO_2$ where M2 is selected from the group consisting of Ni and Al, and $0 \leq x \leq 0.5$;
   $LiNi_{1-x}M3_xO_2$ where M3 is selected from the group consisting of Co and Al, and $0 \leq x \leq 0.5$;
   $LiMn_xNi_yCo_zAl_tO_2$ where $x+y+z+t=1$, and $0 \leq (x, y, z,$ and $t) \leq 1$;
   $LiM4PO_4$ where M4 is selected from the group consisting of Fe, Co, Ni, and Mn;
   $NaMn_{2-x}M5_xO_4$ where M5 is selected from the group consisting of Al, Sn, Zn, and Fe, and $0 \leq x \leq 0.05$;
   $NaCo_{1-x}M6_xO_2$ where M6 is selected from the group consisting of Ni and Al, and $0 \leq x \leq 0.5$;
   $NaNi_{1-x}M7_xO_2$ where M7 is selected from the group consisting of Co and Al, and $0 \leq x \leq 0.5$;
   $NaMn_xNi_yCo_zAl_tO_2$ where $x+y+z+t=1$, and $0 \leq (x, y, z,$ and $t) \leq 1$; and,
   $NaM8PO_4$ where M8 is selected from the group consisting of Fe, Co, Ni, and Mn.

6. The method of claim 1 further comprising the step of calendaring to increase the density of said deposited films prior to heating step (f).

7. The method of claim 6 wherein said calendaring comprises applying a mechanical pressure of at least 2000 psi.

* * * * *